United States Patent

Krekeler et al.

[15] 3,652,216
[45] Mar. 28, 1972

[54] PREPARATION OF SILICA GELS

[72] Inventors: Jerome H. Krekeler; Henri A. Aboutboul, both of Cincinnati, Ohio; William Kirch, Clinton, Iowa

[73] Assignee: National Petro Chemicals Company, Inc., New York, N.Y.

[22] Filed: Oct. 11, 1968

[21] Appl. No.: 766,693

[52] U.S. Cl. ............................................. 23/182, 252/451
[51] Int. Cl. ......................................................... C01b 33/16
[58] Field of Search ..................... 23/182, 110; 252/451, 454

[56] References Cited

UNITED STATES PATENTS

| | | | |
|---|---|---|---|
| 2,731,326 | 1/1956 | Alexander et al. | 23/182 |
| 2,765,242 | 2/1956 | Alexander et al. | 23/182 |
| 2,785,051 | 3/1957 | Miller | 23/182 |
| 2,863,727 | 12/1958 | Thornhill et al. | 23/182 |
| 3,041,140 | 6/1962 | Alexander | 23/182 |
| 3,081,154 | 3/1963 | Acker | 23/182 |
| 3,337,299 | 8/1967 | Burke, Jr. | 23/182 |
| 3,428,425 | 2/1969 | Marotta | 23/182 |
| 3,433,593 | 3/1969 | Reinhardt et al. | 23/182 |
| 3,453,077 | 7/1969 | Hyde | 23/182 |

Primary Examiner—Edward Stern
Attorney—Allen A. Meyer, Jr.

[57] ABSTRACT

Silica xerogels having a narrow pore diameter distribution in the range of 300–600 A. and surface areas in the range from 200–500 m.$^2$/g. and the process of preparing such xerogels comprising critically controlled steps of precipitation of the silica gel, heat aging the precipitated silica hydrogel slurry, washing the aged product with solutions of salts having displacing effect on sodium, disintegrating the gel, drying the gel by azeotropic distillation with a solvent which is nonmiscible with water, and calcining. Also, a process for preparing such xerogels wherein the non-water miscible solvent is continuously recycled so that a minimum amount of solvent need be used.

18 Claims, 5 Drawing Figures

INVENTORS
JEROME H. KREKELER
HENRI A. ABOUTBOUL
WILLIAM KIRCH

BY Sughrue, Rothwell, Mion, Zinn & Macpeak
ATTORNEYS

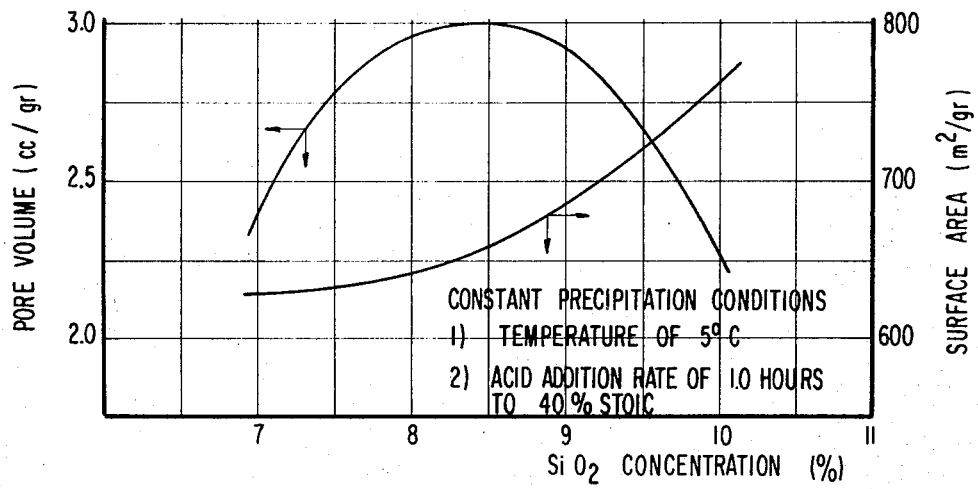
FIG. 3 EFFECT OF SiO₂ CONCENTRATION ON THE PROPERTIES OF SILICA GELS
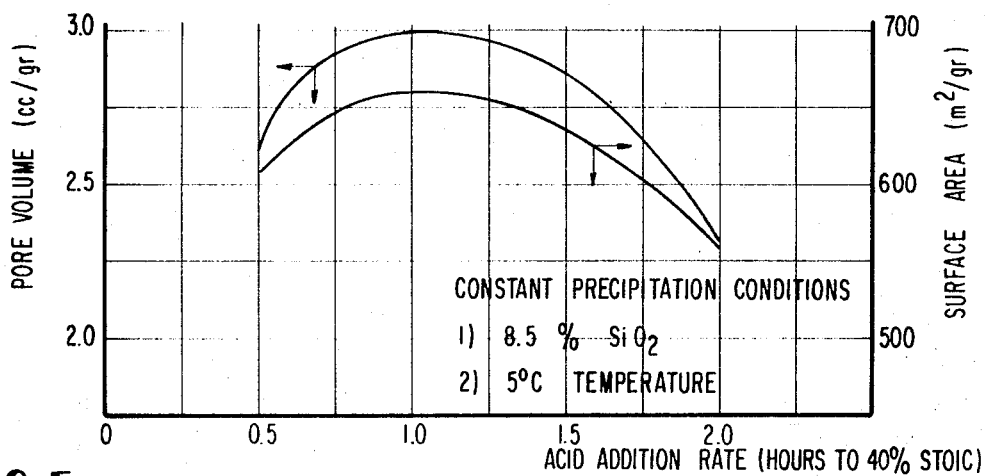
FIG. 4 EFFECT OF ACID ADDITION RATE ON PROPERTIES OF SILICA GEL
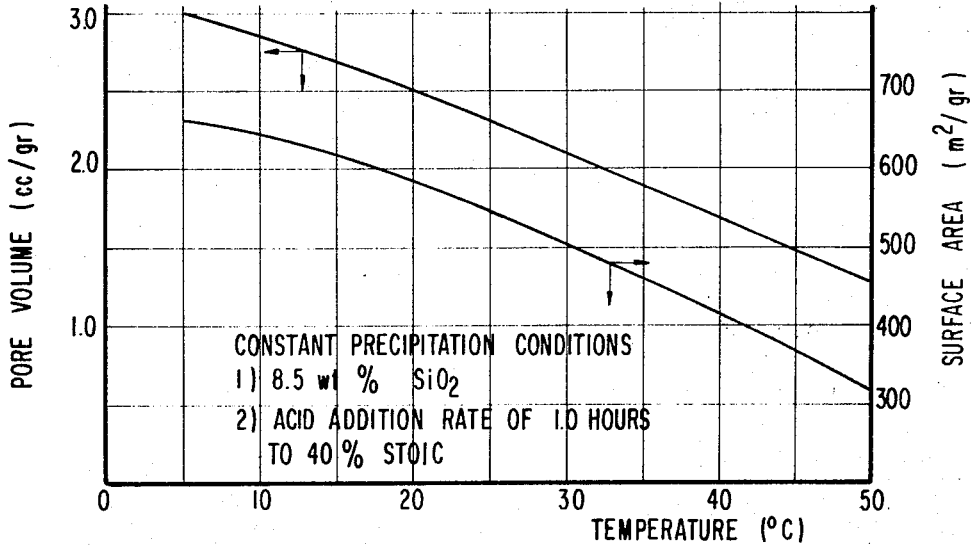
FIG. 5 EFFECT OF PRECIPITATION TEMPERATURE ON THE PROPERTIES OF SILICA GEL

PREPARATION OF SILICA GELS

BACKGROUND OF THE INVENTION

1. Field of the Invention

This invention relates to silica gels having a narrow pore diameter distribution in the pore diameter range of 300–600 A. and surface areas ranging from 200-500 500 m.$^2$/g. and to a process for preparing such silica gels.

2. Description of the Prior Art

Much of the technology in the area of silica gels involves the problem of making strong hard gel masses which will not shrink and crack upon being dried. The gels are useful as absorbents and catalyst bases. Gels of small particle size and narrow particle size distribution, about 50 microns mean diameter, have been found to be the most desirable for fluid bed or stirred reactor catalyst operations because they are more easily fluidized, reduce the amount of erosion of equipment and suffer less degradation by abrasion and particle rupture.

The only such silica gels thus far reported having a suitable particle size and narrow pore size distribution for the purpose mentioned above are those described in our copending applications Ser. Nos. 750,733 and 750,734 both filed Aug. 6, 1968.

In our applications, Ser. No. 750,733 there was disclosed a process for preparing silica xerogels with narrow pore diameter distribution in the range of 300 to 600 A. and a surface area in the range from 200 to 500 m.$^2$/g. which included the step of displacing water before drying the gel so as to reduce the surface tension and other interfacial forces involved in the dehydration process. Such a process is cumbersome because the hydrophilic nature of the silica gel requires a somewhat long equilibrium time to displace the water. Water is normally strongly absorbed on silica gel due to hydrogen bonding with the silanol groups which covers the surface of the gel.

In our application Ser. No. 750,734 there was disclosed a process for preparing silica gels with narrow pore diameter distribution in the range of 300 to 600 A. and surface area in the range from 200 to 500 m.$^2$/g., including the step of drying the silica gel directly from water by freezing and drying the gel under vacuum while the water in the pores is maintained in the frozen state so as to eliminate the effects of the surface tension. However, such a process requires expensive equipment to provide the very low temperatures (down to −160° C.) and very high vacuum. Another basic problem in a commercial process using freeze drying is that there is a tremendous amount of dusting and material carry over, while subliming the ice.

It has now been found that by using certain controlled steps during precipitation, heat aging, washing, comminuting and reducing the gel particle size, and by drying the silica hydrogel by azeotropic distillation with a non-water miscible solvent under certain predetermined conditions, a product equivalent to that obtainable in our copending applications Ser. Nos. 750,733 and 750,734 can be obtained without a corresponding shrinkage of the silica gel. Furthermore, it has been found that this process can be carried out with a limited amount of solvent by decanting the water from the spent solvent and repeatedly re-using the solvent. This procedure precludes any need for rectification or further purification of the solvent.

SUMMARY OF THE INVENTION

The present invention provides a silica gel having a narrow pore diameter distribution, primarily in the range of from 300–600 A., a surface area ranging from 200–500 m.$^2$/g. and stability at temperatures of up to about 2,000° F. in a fluidized bed. The invention further describes a process for preparing the foregoing silica gels directly from water which comprises the following steps:

1. Precipitation of a silica gel by neutralization of aqueous $xNa_2O \cdot ySiO_2$ with a strong acid, a weak acid such as $CO_2$, ion exchange resins, or by other suitable neutralization procedure, carried out in stoichiometric proportions under good agitation and in accordance with the following conditions:

a. The $SiO_2$ concentration in the final slurry is between 5 and 12 percent by weight and preferably from about 8 to 9 percent.

b. The neutralization medium is added at the rate of up to 40 percent of the needed amount in from 30 minutes to 120 minutes, and preferably about 60 minutes, and the remaining 60 percent of the amount is added in from about 20 to 90 minutes more, and preferably about 45 minutes more.

c. The temperature during precipatation is maintained between about 0° and 10° C. and preferably at about 5° C., and d The final pH of the precipitate is from 3 to 8 and preferably between about 6 and 7.

2. Heating the precipitated silica hydrogel slurry under the following conditions:

a. A pH of from 3 to 8, and preferably between 5 and 6.

b. A temperature between 50° and 100° C. and preferably about 90° C., and c. For a period of from 1 to 6 hours and preferably about 4 hours.

3. Washing the product with salts having a displacing effect on sodium so that the filtrate titrates less than 20 p.p.m. sodium concentration. Suitable salts include aluminum chloride or sulfate and the ammonium chloride or nitrate. The displacing can also be accomplished by washing with strong acid such as hydrochloric acid.

4. Comminuting and reducing the gel particle size by high shear mixing from step 3 to obtain particles having a mean diameter of less than about 200 microns and preferably in the range of from 30 to 150 microns.

5. Adding a non-water miscible solvent which forms an azeotrope with water when distilled and distilling the azeotrope so as to remove substantially all the water under specific conditions.

6. Drying the gel from the solvent, by distilling the excess solvent.

7. Calcining the product from step 6 at a temperature between 500° and 1,200° F. and preferably at about 1,000° F.

DETAILED DESCRIPTION OF THE INVENTION

The azeotropic distillation is conducted by admixing a solvent with the wet gel in an amount in excess of the azeotropic mixture. The admixture is then alternately refluxed for 0.5 to 2 hours and distilled for a total cycle time of between about 5 to 20 hours and preferably about 8 hours. The temperature of the distillation is dependent upon the particular solvent used and the pressure of the system.

Figure 1:
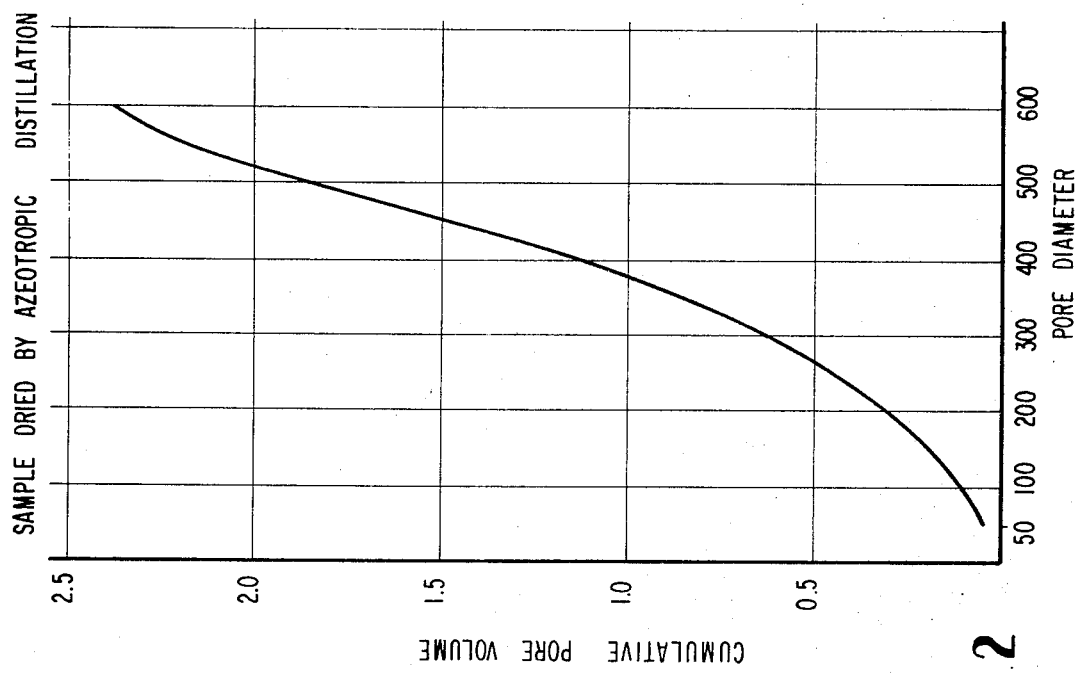

A preferred method of carrying out this distillation process is shown in FIG. 1. In this process, the hydrogel is charged into the jacketed vessel 1 through valve A. A solvent which is non-miscible with water and which forms an azeotropic with water, is retained in storage tank 3 and is pumped into vessel 1. The preferred quantity of solvent is an amount equal to the amount of water contained in vessel 1, although smaller quantities can be used. Vessel 1 is then heated to provide the required distillation.

The distillate is recovered through heat exchanger 2 into storage tank 3 where the azeotrope separates into two phases and water is removed by decantation.

The solvent portion is recirculated into the system by being continuously pumped back into vessel 1 and the system is operated for between about 2 to 20 hours, preferably for about 5 hours, after which pump 4 is stopped and excess solvent is distilled until the silica gel is dried.

Two high and low capacitance probes 5 and 6 are located at the bottom of tank 3 which activate motor valve 7 draining the water from the tank through line 8.

The dry silica gel is discharged through valve B.

Adequate solvents for the present process include: benzene, toluene, xylene, ethyl-acetate, n-propyl formate, n- and iso-butyl formate, n-and iso-amyl formate, benzyl formate, n-propyl acetate, n and iso-butyl acetate, n-and iso-amyl acetate, benzyl acetate, phenyl acetate, ethyl propionate, n-propyl propionate, iso-butyl propionate, iso-amyl propionate, methyl butyrate, n-propyl butyrate, n and iso-butyl butyrate, iso-amyl butyrate, methyl iso-butyrate, ethyl iso-butyrate, di-iso-butyl ether, di-iso-amyl ether, diphenyl ether, phenetole, anisole, resorcinol diethyl ether and other solvents which are nonmiscible with water and which form azeotropic mixtures when distilled with water.

The invention will now be described in greater detail with reference to specific examples which illustrate the criticality of process conditions in order to obtain a silica xerogel product having a narrow pore diameter distribution primarily in the range of from 300–600 A., surface area in the range of from 200–500 m.$^2$/g. and stability at temperatures up to 2,000° F. in a fluidized bed.

The properties of the silica xerogel obtained in accordance with the invention and particularly the porosity characteristics are discussed in terms of pore volume (PV), surface area (SA), average pore diameter (Pd), where $Pd = 4PV/SA$, and pore size distribution. The determination of the values for the various properties were made by a nitrogen absorption-desorption technique which is well known in the art and which is described in greater detail in the literature. For example, a description of the nitrogen absorption-desorption procedure for evaluating the porosity of silica gel is found in the Journal of the American Chemical Society, Volume 60, page 309 (1938), Journal of Catalysis, Volume 2, page 111 (1955) and elsewhere.

In the following examples, Example I and Example II describe a preferred method for carrying out the process of the invention so as to obtain a silica xerogel of the stated characteristics. The remaining examples illustrate the criticality of various process conditions and describe suitable alternative procedures for obtaining the silica xerogels.

EXAMPLE I 20,160 g. of sodium silicate solution containing 28.7 % $SiO_2$ and 8.9% $Na_2O$ was added to 25,440 g. of $H_2O$ and the mixture cooled to 5° C. under agitation.

21,305 g. of $H_2SO_4$ (12.75 wt. percent) were than added as follows:

8,520 g. were added in one hour and the remaining amount in 45 minutes. The final pH of the precipitate was 5.0.

The slurry was then heated to 95° C. within 2 hours and maintained at 95° C. for 2 hours, washed with a solution of 2,225 g. of $NH_4NO_3$ in 45-gallons of water, then with deionized water until the filtrate titrated less than 20 p.p.m. $Na_2SO_4$.

The product was then homogenized for 30 minutes after which a 300 g. sample was drawn, allowed to settle and the excess water decanted.

60 g. of slurry, containing 11 percent by weight of solids was recovered and added to 1,500 g. of ethyl acetate in a distillation flask. The azeotrope was then distilled at atmospheric pressure by using the following procedure: alternatively distilling for ½ hour and refluxing for 1 ½ hours for a total process time of 8 hours. For precaution, the solvent was continuously added to maintain the same level of liquid in the flask. Temperature fluctuations during the azeotropic distillation were between 70.5° and 71° C. After 8 hours, the gel was dried by distilling the remaining solvent.

The silica xerogel recovered was calcined in an oven at 1,000° F. for 4 hours before evaluating.

Analysis of the physical properties were: $SA = 307$ m.$^2$/g., $PV = 2.35$ cm.$^3$/g., $Pd = 317$ A.

EXAMPLE II

A 1,000 g. sample obtained in Example I after homogenization was drawn, allowed to settle and the excess water decanted.

A 200 g. sample of the slurry containing 11 percent by weight solids was then added to a 2,000 ml. distillation flask installed in a laboratory setup equivalent to the one represented in FIG. 1. 1,000 g. of ethyl acetate was pumped into the distillation flask before starting the distillation, and the distillation was run for 5 hours. The ethyl acetate continuously recovered was pumped back into the distillation flask after the water had been separated by decantation, at a rate equal to the distillation rate of the solvent phase.

After 5 hours, the pump was stopped and the excess solvent distilled off as to obtain a dried silica gel.

The xerogel recovered was calcined in an oven at 1,000° F. for 4 hours and evaluated for its physical properties. $SA = 323$ m.$^2$/g., $PV = 2.53$ cm.$^3$/g., $Pd = 313$ A.

Figure 2:
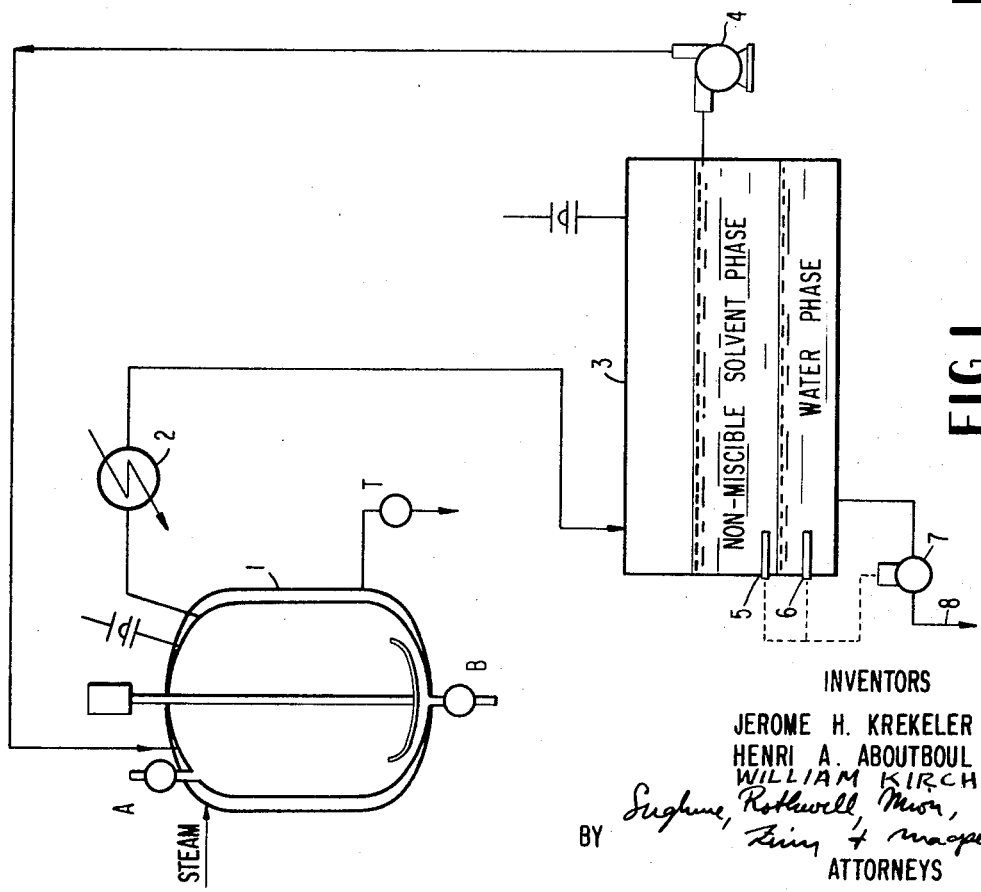

FIG. 2 is a distribution curve of the pore sizes. It can be seen that the major portion of the pore volume of the silica xerogel product is accounted for by the gel having a pore size distribution in the narrow range of from 300 to 600 A.

Calcination in a fluidized bed for 3 hours at 1,800° F. did not alter the physical properties which were: $SA = 329$ m.$^2$/g., $PV = 2.47$ cm.$^3$/g., $Pd = 301$ A.

EXAMPLE III

In this Example, a 300 g. sample obtained after homogenization in Example I was drawn and the excess water decanted.

A 60 g. sample containing 11 percent by weight solids was then added to 1,500 g. of ethyl acetate. The azeotrope followed by the excess solvent were distilled off in a continuous manner.

The silica xerogel obtained was calcined in the oven for 4 hours at 1,000° F. and evaluated for its physical properties: $SA = 342$ m.$^2$/g., $PV = 1.91$ cm.$^3$/g., $Pd = 223$ A.

As can be seen when using an azeotropic distillation without using the conditions described in Example I or Example II to dry the product, the pore volume and consequently the average pore diameter were adversely affected.

EXAMPLE IV

To compare the azeotropic distillation technique to the water displacement technique, as disclosed in copending application Ser. No. 750,734, a 30 g. sample was prepared as in Example I and was washed until the filtrate titrated less than 20 p.p.m. $Na_2SO_4$. The product was then homogenized, reslurried in acetone and washed with acetone by decantation until the water in the acetone titrated less than 1 percent.

The acetone was distilled off and the resulting silica gel was calcined in an oven at 1,000 ° F. for 4 hours.

The physical properties of the silica obtained were found to be substantially the same as those obtained by the water displacement technique, $SA = 333$ m.$^2$/g., $PV = 2.50$ cm.$^3$/g., average $Pd = 300$ A.

EXAMPLE V

All the variables during precipitation, except the concentration of the silica during precipitation were maintained as in Example I. The final $SiO_2$ concentration was 7 and 10 percent by weight. FIG. 3 shows the effect of $SiO_2$ concentration on the porosity of the gel just after precipitation.

Referring to FIG. 3 of the drawing, it will be seen that relatively lower pore volumes are obtained where the final silica concentration in the slurry is between 7 and 10 percent by weight as compared with the pore volume obtained in Example I where an $SiO_2$ concentration of about 8.5 percent by weight was obtained. FIG. 3 also demonstrates that surface area increases as the concentration of $SiO_2$ increases. Thus, in order to get maximum pore volume and at the same time to obtain a good surface area level, it is preferable to maintain the $SiO_2$ concentration at between about 8 and 9 percent by weight and most preferably at about 8.5 by weight.

EXAMPLE VI

All variables during precipitation, except the acid addition rate, was maintained as in Example I. An acid addition rate of 0.5 hours and 2.0 hours. for the addition of 40 percent of the stoichiometric amount of $SiO_2$ was used.

Example VI clearly illustrates, as shown in FIG. 4 of the drawings, that both pore volume and surface area are dependent upon the rate in which the neutralizing medium, in this case, sulfuric acid, is added to the aqueous silicate solution. It will be seen that optimum pore volume and surface area values are obtained using an addition rate of about 1 hour for 40 percent of the stoichiometric amount and that lower values for pore volume and surface area are obtained where more rapid or slower addition rates are employed.

EXAMPLE VII

All variables during precipitation, except temperature, were maintained as in Example I. Temperatures of 25° C. and 50° C. were used during precipitation.

As will be seen by reference to FIG. 5, the pore volume decreases as the precipitation temperature increases. Surface area also tends to decrease with an increase in the precipitation temperature, but this value flattens out at about 5° C. This is the preferred temperature of precipitation in order to secure optimum values for pore volume and surface area.

EXAMPLE VIII

All variables during precipitation were maintained the same as in Example I, except $CO_2$ was used to neutralize the sodium silicate instead of sulfuric acid. The physical properties of the silica gel were similar to those obtained under Example I.

EXAMPLE IX

All variables during precipitation were maintained as in Example I. After precipitation, the gel was adjusted to pH 9.0 by adding NaOH (2-normal) and heating for 1 hour. The gel was then washed with water and acetone as in Example II before evaluating it.

The properties of the silica gel were $SA = 346 m.^2/g.$, $PV = 1.96 cm.^3/g.$, $Pd = 226$ A.

As will be seen by comparing the properties of the gel obtained in accordance with Example IX with a product of Example I, too high pH and relatively brief heating during the aging step results in a loss of pore volume. The pore volume obtained in Example I was 2.35 cm.³/g. as compared with only 1.96 cm.³/g. for Example IX.

EXAMPLE X

All variables during precipitation were again maintained as in Example I. After precipitation, the gel was adjusted to pH 5.0 by adding $H_2SO_4$ (1-normal), and heated to 95° C. for 4 hours. Samples were taken after different lengths of time, washed with water and then with acetone as in Example IV before evaluating them.

Table I shows the influence of the length of heating time on the porosity of the gel and its pore distribution:

TABLE I

| Time, hrs.: | S.A. (m.²/g.) | P.V. (cm.³/g.) | Pd (A.) |
|---|---|---|---|
| 0 | 757 | 2.77 | 147 |
| ½ | 492 | 2.72 | 221 |
| 1 | 394 | 2.90 | 294 |
| 1½ | 355 | 2.76 | 311 |
| 2 | 343 | 2.77 | 323 |
| 4 | 284 | 2.56 | 362 |

As will be seen from the data reported in Table I, the thermal aging of the precipitation should be conducted for a minimum of about 1 hour in order to obtain a silica xerogel product having an average pore diameter in the desired range of from about 300 to 600 A.

EXAMPLE XI

All variables during precipitation and heating were again maintained as in Example I. The gel was then washed as in Example I, but only until the filtrate titrated 100 p.p.m. $Na_2SO_4$. The product was then treated with acetone and evaluated. The physical properties of the gel were substantially the same as in Example I.

When the product was calcined in a fluidized bed at 1,825° F. for 3 hours and evaluated, the properties were: $SA = 225$ m.²/g., $PV = 1.62$ cm.³/g., $Pd = 286$ A.

As will be seen from the porosity values of the product obtained in accordance with Example XI, the surface area, pore volume and average pore diameter are all adversely affected by the relatively high level of $Na_2SO_4$ in the product.

While the invention has been particularly shown and described with reference to a preferred embodiment thereof, it will be understood by those skilled in the art that various changes in form and details may be made therein without departing from the spirit and scope of invention.

What is claimed is:

1. A method for producing a silica xerogel having a narrow pore size distribution primarily within the range of from 300–600 A., a surface area within the range of from 200–500 m.²/g. and stability at temperatures up to about 2,000° F. in a fluidized bed, comprising:
   a. precipitating a silica hydrogel by neutralization of an aqueous solution of sodium silicate to provide a silica hydrogel slurry having an $SiO_2$ concentration of from about 5 to 12 percent and a pH of from about 3 to 8, the temperature during precipitation being maintained between 0° and 10° C., the neutralization medium being added at the rate of up to 40 percent of the stoichiometric amount within from 30 to 120 minutes and the remaining amount of such medium being added within from about 20 to 90 additional minutes,
   b. heating the product of step (a) at a pH of from about 3 to 8 and at a temperature of from about 50° to 100° C. for from 1 to 6 hours,
   c. washing the product of step (FI) to reduce the sodium ion concentration in the product of step (b) such that the filtrate titrates less than 20 p.p.m.,
   d. comminuting the product of step (c) by high shear mixing to reduce the size of the hydrogel particles to a mean diameter of less than about 200 microns,
   e. adding a solvent which is non-miscible with and which forms an azeotropic mixture with water,
   f. distilling said azeotropic mixture so as to essentially completely separate the water from said gel prior to the completion of distillation, and
   g. drying the gel from the solvent by distilling the excess solvent.

2. The method of claim 1 wherein the precipitation of silica hydrogel in step (a) is accomplished by neutralization of the aqueous solution of sodium silicate with an agent selected from the group consisting of a strong acid, a weak acid, and an ion-exchange resin.

3. The method of claim 2 wherein the precipitation of silica hydrogel in step (a) is accomplished by neutralizing with a strong acid.

4. The method of claim 1 wherein the $SiO_2$ concentration in the hydrogel precipitate of step (a) is from about 8 to 9 percent by weight.

5. The method of claim 1 wherein the temperature during neutralization step (a) is about 5° C.

6. The method of claim 1 wherein the pH of the hydrogel precipitation in step (a) is adjusted to from about 5 to 6.

7. The method of claim 1 wherein pH of the slurry in step (b) is from about 5 to 6.

8. The method of claim 1 wherein the temperature of the slurry during step (b) is about 90° C.

9. The method of claim 1 wherein the time of step (b) is about 4 hours.

10. The method of claim 1 wherein the reduction of concentration of Na-ions is accomplished by washing with a solution of displacing salts.

11. The method of claim 10 wherein said salts are selected from the group consisting of aluminum chloride, aluminum sulfate, ammonium chloride, ammonium nitrate or mixtures thereof.

12. The method of claim 1 wherein step (c) is accomplished by washing with a solution of a strong acid.

13. The method of claim 12 wherein said acid is selected from the group consisting of HCl and $H_2SO_4$.

14. The method of claim 1 wherein the solvent in step (e) is added in an amount in excess of that required to provide an azeotropic mixture.

15. The method of claim 1 wherein said azeotropic mixture is alternately refluxed for 0.5 to 2 hours and distilled so that the total process time is between 5 and 20 hours.

16. The method of claim 1 wherein the solvent in step (e) is added in an amount substantially less than that required to provide an azeotropic mixture, the solvent being continuously recycled after decantation of the water from the distilled azeotropic mixture.

17. A method for producing a silica xerogel having a narrow pore size distribution primarily within the range of from 300–600 A., a surface area within the range of from 200–500 m$^2$/g and stability at temperatures up to about 2,000° F in a fluidized bed, comprising:
   a. precipitating a silica hydrogel by neutralization of an aqueous solution of sodium silicate to provide a silica hydrogel slurry having an $SiO_2$ concentration of from about 8 to 9 percent by weight, the temperature during precipitation being maintained at about 5° C., and the pH of the precipitate being maintained at from about 5 to 6, the neutralization medium being added at the rate of up to 40% of the stoichiometric amount within from 30 to 120 minutes and the remaining amount of such medium being added within from about 20 to 90 additional minutes,
   b. heating the product of step (a) at a temperature of about 90° C. for about 4 hours,
   c. washing the product of step (b) to reduce the sodium concentration measured as $Na_2SO_4$, so that the filtrate from the washing titrates less than 20 p.p.m. of sodium,
   d. disintegrating the product of step (c) by high shear mixing to reduce the size of the hydrogel particles to a mean diameter in the range of from 30 to 150 microns,
   e. adding a solvent which is non-miscible with water and which forms an azeotropic mixture with water,
   f. distilling said azeotropic mixture so as to essentially completely separate the water from the gel prior to the completion of distillation, and
   g. drying the gel from the solvent by distilling the excess solvent.

18. A method for producing a silica xerogel having a narrow pore size distribution primarily within the range of from 300–600 A., a surface area within the range of from 200–500 m.$^2$/g. and stability at temperatures up to about 2,000° F. in a fluidized bed, comprising:
   a. precipitating a silica hydrogel by neutralization of an aqueous solution of sodium silicate to provide a silica hydrogel slurry having an $SiO_2$ concentration of from about 5 to 12 percent and pH of from about 3 to 8, the temperature during precipitation being maintained between 0° and 10° C., the neutralization medium being added at the rate of up to 40 percent of the stoichiometric amount within from 30 to 120 minutes and the remaining amount of such medium being added within from about 20 to 90 additional minutes,
   b. heating the product of step (a) at a ph of from about 3 to 8 and at a temperature of from about 50° to 100° C. for from about 1 to 6 hours,
   c. washing the product of step (b) to reduce the sodium ion concentration in the product of step (b) such that the filtrate titrates less than 20 p.p.m.
   d. comminuting the product of step (c) by high shear mixing to reduce the size of the hydrogel particles to a means diameter of less than about 200 microns,
   e. adding a solvent which is non-miscible with and which forms an azeotropic mixture with water,
   f. distilling the said azeotropic mixture so as to produce a two phase distillate, one of which is water and the other being the organic solvent, decanting the water and recycling the solvent portion back into the system, continuing this operation until essentially all of the water is removed, and
   g. drying the gel from the solvent by distilling the excess solvent.

* * * * *